US00RE44198E

(19) United States
(12) Reissued Patent
An et al.

(10) Patent Number: US RE44,198 E
(45) Date of Reissued Patent: May 7, 2013

(54) METHOD OF PROVIDING POINT-TO-MULTIPOINT SERVICE IN MOBILE COMMUNICATION SYSTEM

(75) Inventors: Jong Hoe An, Anyang-si (KR); Seok Woo Lee, Anyang-si (KR); Young Woo Yun, Anyang-si (KR); Ki Jun Kim, Anyang-si (KR); Young Jun Kim, Anyang-si (KR); Chan Ho Kyung, Anyang-si (KR); Young Cheul Yoon, San Diego, CA (US); Sang Gook Kim, San Diego, CA (US); Li-Hsiang Sun, San Diego, CA (US); Shu Wang, San Diego, CA (US)

(73) Assignee: LG Electronics Inc., Seoul (KR)

(21) Appl. No.: 13/560,777

(22) Filed: Jul. 27, 2012

Related U.S. Patent Documents

Reissue of:
(64) Patent No.: 8,000,257
Issued: Aug. 16, 2011
Appl. No.: 11/993,874
PCT Filed: Jun. 26, 2006
PCT No.: PCT/KR2006/002464
§ 371 (c)(1),
(2), (4) Date: Jan. 7, 2010
PCT Pub. No.: WO2006/137720
PCT Pub. Date: Dec. 28, 2006

U.S. Applications:
(60) Provisional application No. 60/698,722, filed on Jul. 12, 2005.

(30) Foreign Application Priority Data

| | | |
|---|---|---|
| Jun. 24, 2005 | (KR) | 10-2005-0055001 |
| Jul. 13, 2005 | (KR) | 10-2005-0063245 |
| Aug. 16, 2005 | (KR) | 10-2005-0074612 |
| Sep. 15, 2005 | (KR) | 10-2005-0086564 |

(51) Int. Cl.
*H04L 1/00* (2006.01)
*H04H 20/71* (2008.01)

(52) U.S. Cl.
USPC ..... 370/252; 370/312; 455/69

(58) Field of Classification Search ..... None
See application file for complete search history.

(56) References Cited

U.S. PATENT DOCUMENTS

| | | | |
|---|---|---|---|
| 2003/0103470 | A1 | 6/2003 | Yafuso |
| 2003/0228865 | A1 | 12/2003 | Terry |
| 2005/0068908 | A1 | 3/2005 | Qian et al. |
| 2005/0085254 | A1 | 4/2005 | Chuah et al. |
| 2005/0113099 | A1 | 5/2005 | Eriksson et al. |
| 2005/0129058 | A1 | 6/2005 | Casaccia et al. |
| 2006/0221896 | A1 | 10/2006 | Vaittinen et al. |
| 2007/0037523 | A1 | 2/2007 | Bi et al. |
| 2007/0127407 | A1 | 6/2007 | Attar et al. |
| 2008/0031179 | A1 | 2/2008 | Gao et al. |
| 2008/0123578 | A1 | 5/2008 | Golitschek Edler Von Elbwart et al. |
| 2008/0232291 | A1 | 9/2008 | Hus et al. |
| 2008/0268894 | A1 | 10/2008 | Terry |
| 2009/0274059 | A1 | 11/2009 | Xing et al. |
| 2010/0110872 | A1 | 5/2010 | Hartman, Jr. |

FOREIGN PATENT DOCUMENTS

| | | |
|---|---|---|
| EP | 1143635 | 10/2001 |
| EP | 1363467 | 11/2003 |
| JP | 2002/368684 | 12/2002 |
| KR | 10-2004-0041289 | 5/2004 |
| KR | 10-2004-0093498 | 11/2004 |
| KR | 10-2005-0062359 | 6/2005 |

*Primary Examiner* — Clemence Han
(74) *Attorney, Agent, or Firm* — Lee, Hong, Degerman, Kang & Waimey

(57) ABSTRACT

A method of providing a point-to-multipoint service in a mobile communication system and transmission controlling method thereof are disclosed, by which a better quality of a point-to-multipoint service can be provided in a manner of coping with time-variable channel situation variable adaptively. In a mobile communication system providing a point-to-multipoint service, the present invention includes the steps of receiving data for the point-to-multipoint service from a base station, measuring a reception quality for the received point-to-multipoint service data, and transmitting reception quality information for the point-to-multipoint service data to the base station.

12 Claims, 6 Drawing Sheets

METHOD OF PROVIDING POINT-TO-MULTIPOINT SERVICE IN MOBILE COMMUNICATION SYSTEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a reissue of U.S. Pat. No. 8,000,257, which issued on Aug. 16, 2011, from U.S. application Ser. No. 11/993,874, filed on Jan. 7, 2010, which is the National Stage filing under 35 U.S.C. 371 of International Application No. PCT/KR2006/002464, filed on Jun. 26, 2006, which claims the benefit of earlier filing date and right of priority to Korean Application Nos. 10-2005-0055001, filed on Jun. 24, 2005, 10-2005-0063245, filed on Jul. 13, 2005, 10-2005-0074612, filed on Aug. 16, 2005, and 10-2005-0086564, filed on Sep. 15, 2005, and also claims the benefit of U.S. Provisional Application Ser. No. 60/698,722, filed on Jul. 12, 2005.*

FIELD OF INVENTION

The present invention relates to a mobile communication system, and more particularly, to a method of providing a point-to-multipoint service in a mobile communication system and transmission controlling method thereof.

BACKGROUND ART

Generally, a point-to-multipoint service in a mobile communication system means a service provided to a plurality of user equipments by a network through a point-to-multipoint connection between the network and a plurality of the user equipments. The point-to-multipoint connection can be compared to a point-to-point connection that means a connection between a network and a user equipment or between a pair of user equipments.

Recently, many efforts have been made to provide various multimedia services via a mobile communication system, which mainly relates to a point-to-multipoint service via broadcasting or multicasting. Various names are used as a point-to-multipoint service according to an associated mobile communication system. In particular, a multimedia broadcast/multicast service (MBMS), a broadcast/multicast (BCMC) service, a multicast broadcast service (MBS) and the like are sorts of the point-to-multipoint services.

In the following description, the broadcast/multicast service as a sort of the point-to-multipoint service is mainly explained. Yet, the same idea or explanation is applicable to other sorts of point-to-multipoint services.

First of all, in a mobile communication system supporting a broadcast/muiticast (hereinafter abbreviated BCMC), multimedia data including video as well as audio is transmitted at a high data rate to mobile stations located within an area.

In order to provide a BCMC service, a packet data channel of a physical layer is able to support a high data rate. In a current mobile communication system, BCMC data are transmitted via packet data channels of a previously existing physical layer.

In a BCMC service, broadcast contents created by a base station or contents delivered from another base station are transmitted to a plurality of mobile stations within a base station area. For the contents transmission using the BCMC, a protocol is agreed in advance between a base station and a mobile station.

BCMC data is transmitted via a packet data channel. Since BCMC uses a method of transmitting data to a plurality of mobile stations from one base station, there exists no individual feedback for a reception quality from each of a plurality of the mobile stations.

For instance, in case that there exists an error in a received packet, a mobile station does not feed back such a signal as an acknowledgement (hereinafter abbreviated ACK) and a negative acknowledgement (hereinafter abbreviated NACK) to a base station.

So, in order to enable all mobile stations within a base station area to receive data with a quality exceeding a prescribed level, a base station providing a BCMC service decides a transmission data rate by considering a payload size, the number of subpackets for hybrid automatic repeat request (hereinafter abbreviated HARQ), a modulation scheme and the like.

Namely, since there is no feedback from a receiving side in a BCMC service, a base station is unable to change a transmission data rate according to a channel environment but transmits a packet at a decided data rate to all mobile stations within a base station area. So, each base station decides a data rate to have a packet error rate (hereinafter abbreviated PER) equal to or lower than a reference value for all mobile stations within its area and then transmits a packet at the decided data rate.

For instance, by considering a fading environment, an interference environment or a cell radius and the like, a base station having a good channel environment overall provides a BCMC service at a high data rate or a base station having a poor channel environment overall provides a BCMC service at a low data rate.

However, as mentioned in the foregoing description, if a BCMC service is performed after deciding a data rate for each base station, it is unable to cope with channel quality degradation due to a subsequent situation. Hence, a service quality can be degraded.

DISCLOSURE OF INVENTION

Accordingly, the present invention is directed to a method of providing a point-to-multipoint service in a mobile communication system and transmission controlling method thereof that substantially obviate one or more problems due to limitations and disadvantages of the related art.

An object of the present invention is to provide a method of providing a point-to-multipoint service in a mobile communication system and transmission controlling method thereof, by which a better quality of a point-to-multipoint service can be provided in a manner of coping with time-variable channel situation adaptively.

Another object of the present invention is to provide a method of providing a point-to-multipoint service in a mobile communication system and transmission controlling method thereof, by which quality information for a point-to-multipoint service provided by a network can be effectively fed back.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a mobile communication system providing a point-to-multipoint service, a method of controlling a point-to-multipoint service transmission according to the present invention includes the steps of receiving data for the point-to-multipoint service from a base station, measuring a reception quality for the received point-to-multipoint service data, and transmitting reception quality information for the point-to-multipoint service data to the base station.

In another aspect of the present invention, in a mobile communication system providing a point-to-multipoint service, a method of controlling a point-to-multipoint service transmission includes the steps of receiving data for the point-to-multipoint service from a base station, receiving control information associated with reception quality information of the point-to-multipoint service data from the base station, measuring a reception quality for the received point-to-multipoint service data, and transmitting the reception quality information for the point-to-multipoint service data to the base station according to the control information.

In another aspect of the present invention, a method of providing a point-to-multipoint service in a mobile communication system includes the steps of transmitting data for the point-to-multipoint service to a plurality of mobile stations, receiving reception quality information for the point-to-multipoint service data from at least one of the plurality of mobile stations, and controlling a quality of the point-to-multipoint service according to the reception quality information.

In another aspect of the present invention, a method of providing a point-to-multipoint service in a mobile communication system includes the steps of transmitting data for the point-to-multipoint service to a plurality of mobile stations, transmitting control information associated with reception quality information of the point-to-multipoint service data, receiving the reception quality information for the point-to-multipoint service data, wherein the reception quality information is transmitted from at least one of the plurality of mobile stations according to the control information, and controlling a quality of the point-to-multipoint service according to the reception quality information.

In a further aspect of the present invention, in a mobile communication system providing a point-to-multipoint service, a method of controlling a point-to-multipoint service transmission includes the steps of receiving a plurality of data packets for the point-to-multipoint service from a base station, checking whether a reception error rate for the plurality of data packets exceed a prescribed threshold, and transmitting reception acknowledgement information for the plurality of data packets according to the checking result.

It is to be understood that both the foregoing general description and the following detailed description of the present invention are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this application, Illustrate embodiment(s) of the invention and together with the description serve to explain the principle of the invention. In the drawings.

BEST MODE FOR CARRYING OUT THE INVENTION

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention explained in the following description relate to a broadcast/multicast (BCMC) service as a sort of a point-to-multipoint service. Yet, it is apparent to those skilled in the art that the technical features of the present invention is applicable to other kinds of point-to-muitipoint services such as a multimedia broadcast/multicast service (MBMS), a multicast broadcast service (MBS) and the like.

Figure 1:
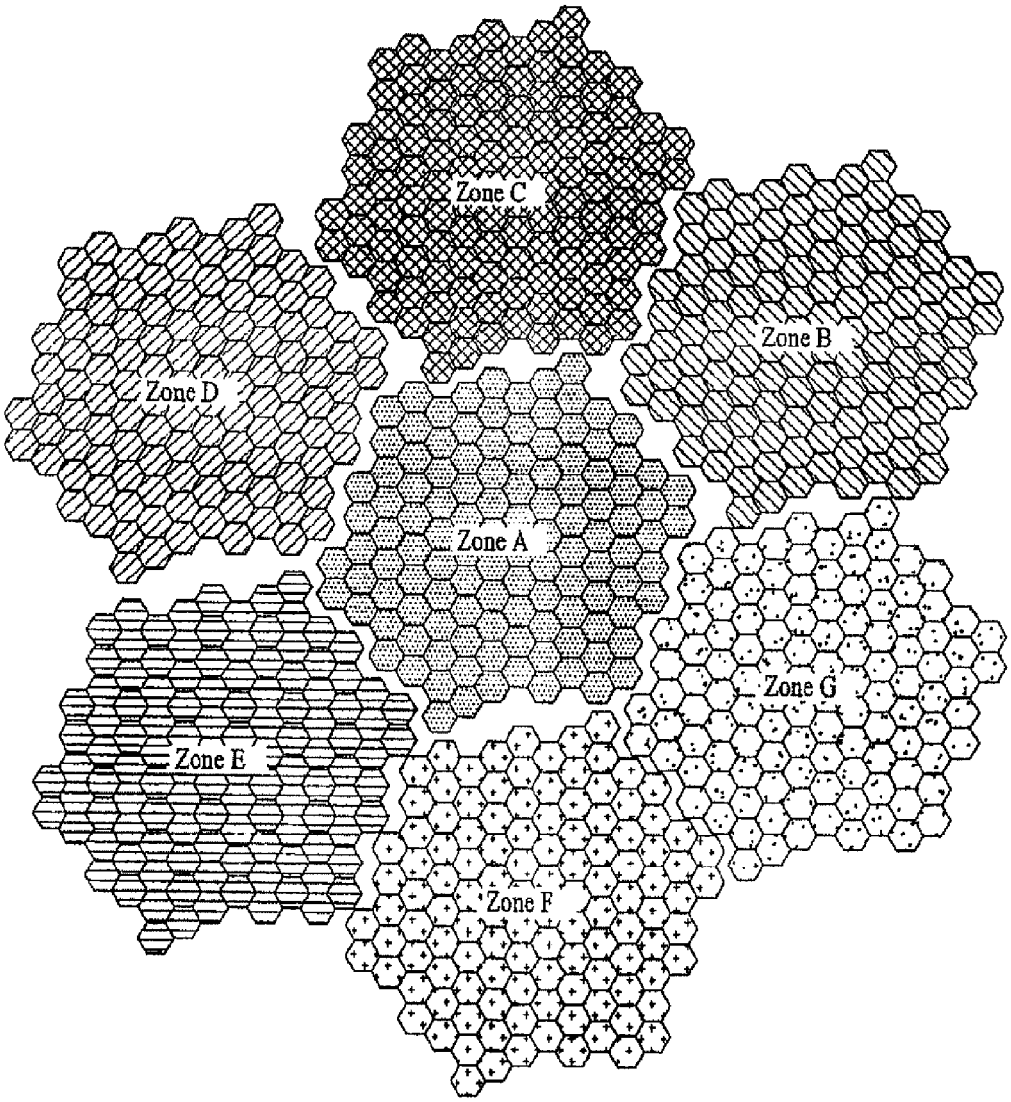
FIG. 1 is a diagram for explaining a zone-based service according to one embodiment of the present invention.

FIG. 1 is a diagram for explaining a zone-based service according to one embodiment of the present invention.

Referring to FIG. 1, a BCMC service can be performed by a zone unit. In particular, one unit zone is configured with a plurality of cells and a different BCMC flow service is transmitted to each zone.

In case of performing a BCMC service by a zone unit, since all base stations belonging to each zone transmitting data of the same contents at a same timing point, a mobile station receives signals transmitted from a plurality of base stations located within a same zone and obtains a diversity gain by combining and decoding the received signals.

Yet, since a base station belonging to a different zone at the same timing point transmits data of different contents, a signal transmitted from the base station belonging to the different zone plays a role as interference.

So, In case of providing a zone unit service, a mobile station located in the vicinity of a center of a zone is able to obtain a diversity gain using the same signals transmitted from a plurality of base stations. So, a channel status is good. Yet, a mobile station located at an edge of the zone has a poor channel status attributed to interference signals transmitted from base stations belonging to a different zone.

Figure 2:
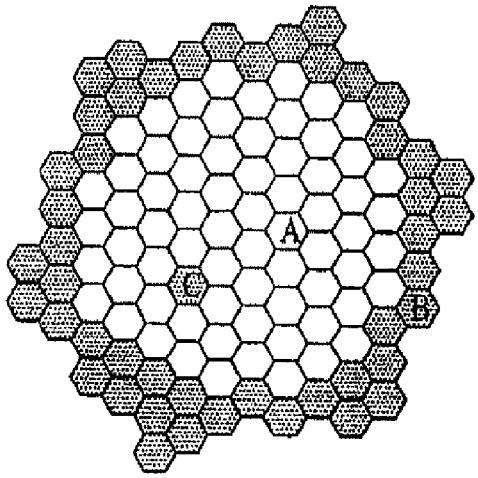
FIG. 2 is a diagram of a cell having a different channel environment within one zone according to one embodiment of the present invention.

FIG. 2 is a diagram of a cell having a different channel environment within one zone according to one embodiment of the present invention.

Referring to FIG. 2, a mobile station, which exists in a cell located at such a central part of a zone as a cell A, is able to obtain a diversity gain by receiving the same packets transmitted from neighbor base stations.

Yet, a mobile station, which exists in a cell located at such a peripheral part of the zone as a cell B, may have a poor channel status since different packets transmitted from cells belonging to a different zone cause interference.

Meanwhile, a mobile station, which exists in a cell located at such a central part of the zone as a cell C, may have a poor channel status due to environmental characteristics of the cell itself such as geography, buildings and the like.

So, in such a cell having a good channel status as the cell A, it is able to transmit a packet at a high data rate. Yet, in such a cell having a poor channel status as the cell B and the cell C, redundant information (redundancy) is attached to overcome the poor channel environment and this needs to be transmitted several times. So, it is unable to avoid transmitting a packet at a low data rate.

Hence, a data rate of a BCMC service transmitted by each base station is decided based on a channel situation tested in an initial cell design. Yet, a channel situation of each cell may differ from that of the initial cell design. So, a service quality is degraded unless a data rate of a specific cell fits a current channel situation.

Figure 3:
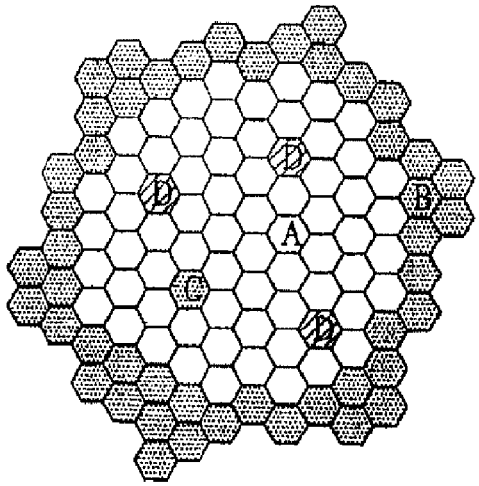
FIG. 3 is a diagram of a cell having a channel environment different from that of a cell design according to one embodiment of the present invention.

FIG. 3 is a diagram of a cell having a channel environment different from that of a cell design according to one embodiment of the present invention.

Referring to FIG. 3, in case of a base station having a good channel environment such as a cell D in designing a cell, a high data rate is selected. In case of a base station having a poor channel environment such as a cell B and a cell C in designing a cell, a low data rate is selected.

Despite the good channel environment of the cell D in an Initial cell design, the channel environment varies due to a new building construction, a geographical change and the like. In this case, a mobile station within the cell D receives a low quality of a BCMC service because a high data rate was selected while the channel status becomes poor now.

On the contrary, when a low data rate was selected due to a bad channel environment in an initial cell design and then the channel environment becomes better, a mobile station also receives the BCMC service of the low quality despite the goon channel environment.

Yet, a base station is unable to know the variation of the channel status, thereby keeping providing the low quality of the BCMC service.

Hence, a mobile station transmits feedback information indicating a channel status to a base station. The base station then needs to perform a BCMC service using the feedback information.

Figure 4:
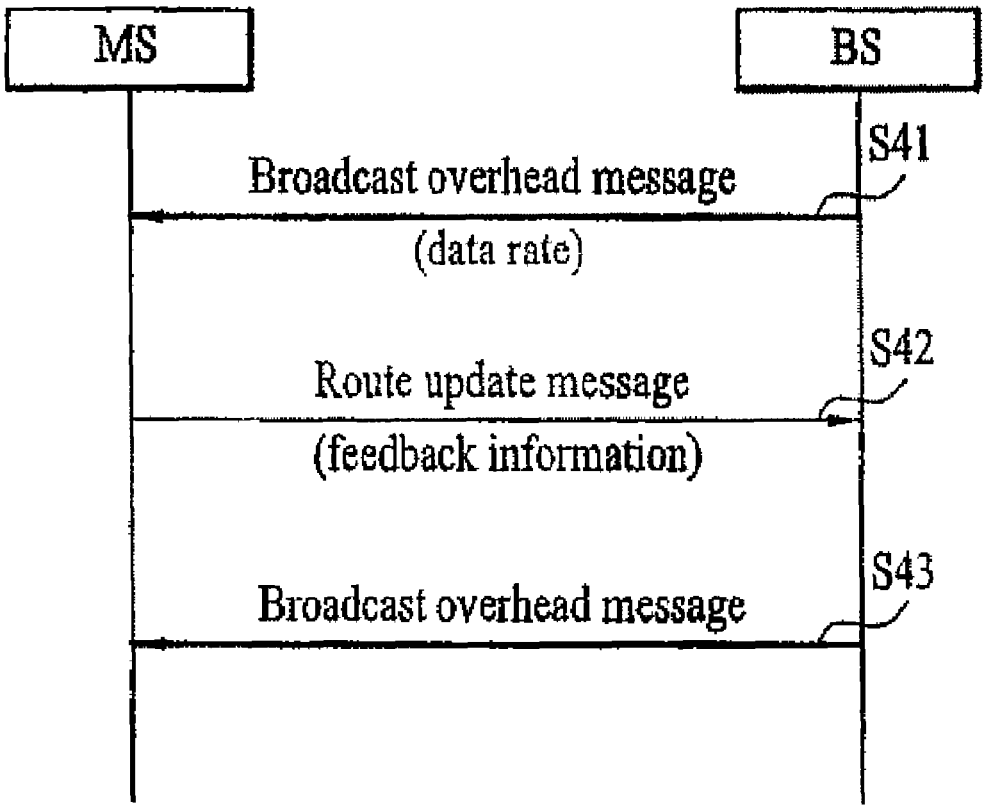
FIG. 4 is a flowchart of a method of controlling a data rate using feedback information in a BCMC service according to one embodiment of the present invention.

FIG. 4 is a flowchart of a method of controlling a data rate using feedback information in a BCMC service according to one embodiment of the present invention.

Referring to FIG. 4, a base station transmits information for a data rate of a current BCMC service flow via a broadcast overhead message (S41).

When reception quality is not good while receiving a BCMC service, a mobile station transmits feedback information for the BCMC service to the base station via a route update message (S42). In this case, the mobile station is able to transmit a PER for the current BCMC service flow, a signal to noise ratio (hereinafter abbreviated SNR) or an indication signal indicating that a current reception quality is low and the like.

In particular, the feedback Information transmitted by the mobile station can be transmitted periodically or at a specific timing point. And, the specific timing point can be requested by the base station. Thus, in case that the feedback information is periodically transmitted, a transmission period is notified to the mobile station by the base station via signaling or can be set in the mobile station itself from the beginning. The fed-back information is reception quality Information that includes information indicating an extent of erroneous packets among received packets (e.g., PER) and channel status Information (e.g., SNR).

Meanwhile, the feedback information transmission period can be varied according to a channel status. For instance, a transmission period is elongated in case of a good channel status or shortened in case of a poor channel status. So, a feedback information transmission frequency is lowered in case of the good channel status. And, the feedback information is more frequently transmitted in case of the poor channel status.

Moreover, a condition for a feedback information transmission for a BCMC service can be given. For instance, if a PER is equal to or greater than a threshold or SNR is reduced equal to or lower than a threshold, or if a number of packets decided as a reception error as a result of reception increases equal to or greater than a threshold, the feedback information can be transmitted.

As a detailed embodiment of the feedback information transmitted by a mobile station to a base station, an On-Off Keying (OOK) scheme can be taken Into consideration whereby 'On' is for NACK and 'Off' is for ACK.

In particular, if a mobile station is able to decode a BCMC packet received from a base station without error, 'Off' (no signal) is transmitted to mean an affirmative reception response (ACK) via the ACK channel. In case that error occurs in the BCMC packet reception, 'On' is transmitted to mean a negative reception response (NACK) via the ACK channel. Since the errorless case will occur less frequently than the erroneous case, this method is able to minimize interference and to save battery power of the mobile station.

As a modified example of the ACK/NACK transmission method using the OOK scheme, Instead of transmitting 'ACK' or 'NACK' for each BCMC packet, 'NACK' is transmitted if a rate of packets having reception errors for BCMC packets received for a predetermined time or N consecutively received BCMC packets exceeds a prescribed threshold. Otherwise, 'ACK' can be transmitted. For example, if the rate of packets having reception errors for BCMC packets received for one minute exceeds 1%, 'NACK' can be transmitted.

As a similar embodiment, 'ACK' or 'NACK' can be transmitted with reference to RS (Reed-Solomon) outer code blocks amounting to a predetermined number (M). For example, if an average number of RS block errors exceed 1%, 'NACK' is transmitted. Otherwise, 'ACK' is transmitted.

In the above-explained embodiments, it is preferable that an offset value on a time axis is assigned to each mobile station. In transmitting the feedback information via the ACK channel. In case that a plenty of mobile stations transmit feedback information at the same time, self-interference or transmission failure is brought about to interrupt another user's transmission.

Figure 5:
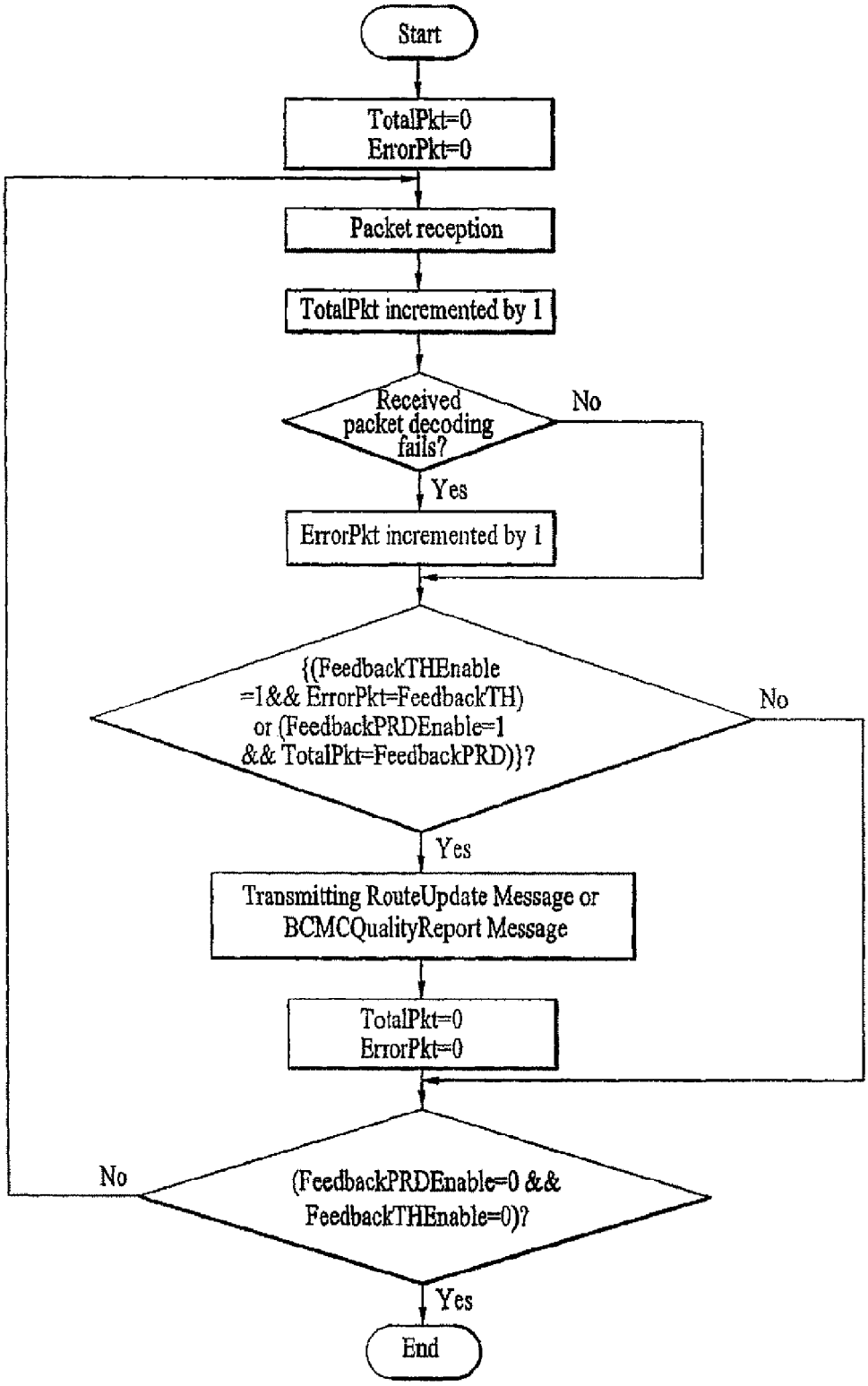
FIG. 5 is a flowchart of a method of controlling a feedback information transmission in a BCMC service according to one embodiment of the present invention.

FIG. 5 is a flowchart of a method of controlling a feedback information transmission in a BCMC service according to one embodiment of the present invention.

Referring to FIG. 5, a base station transmits a broadcast overhead message. In this case, the broadcast overhead message includes control Information associated with a feedback information transmission. In particular, the broadcast overhead message includes at least one of FeedbackTHEnable field, FeedbackPRDEnable field, FeedbackTH field and FeedbackPRD field.

The FeedbackTHEnable field is a field that indicates whether feedback information will be transmitted according to a threshold mode. The FeedbackPRDEnable field is a field that indicates whether feedback information will be transmitted according to a periodic mode. The FeedbackTH field is a field that indicates a threshold in a feedback information transmission according to the threshold mode. And, the FeedbackPRD field is a field that indicates a transmission period in the periodic mode.

The feedback information transmitting method according to the threshold mode and the periodic feedback information transmitting method according to the periodic mode can be independently set.

Meanwhile, a mobile station posses a pair of counters named TotalPkt and ErrorPkt. The TotalPkt is the counter indicating a total number of received packets. The TotalPkt is incremented by 1 each time a packet is received. And, the ErrorPkt is the counter indicating a total number of packets failing in decoding. The ErrorPkt is incremented by 1 each time a received packet decoding falls.

Each of the counters TotalPkt and ErrorPkt is Initialized into 0. An elapse of a specific time can be known through a count of the counter TotalPkt. And, a PER can be calculated through a ratio between the counters TotalPkt and ErrorPkt.

The mobile station transmits feedback information using the information received via the broadcast overhead message in case that FeedbackTHEnable is '1' (i.e., a case that feedback Information is transmitted according to a threshold mode) and that a value of the counter ErrorPkt becomes FeedbackTH (i.e., a case that decoding falls over a specific threshold) or in case that Feedback PRDEnable is '1 (i.e., a case that feedback information is periodically transmitted according to a periodic mode) and that a value of the counter TotalPkt becomes FeedbackPRD (i.e., a case of a preset period).

The feedback information can be transmitted in a manner of separately configuring a BCMC quality report message for a BCMC service quality feedback.

Meanwhile, the feedback information can be transmitted by being included in a route update message.

A procedure for deciding whether the value of the counter ErrorPkt is identical to the FeedbackTH and a procedure for deciding whether the value of the counter TotalPkt is identical to the FeedbackPRD can be independently performed. Hence, one of the two cases is selectively performed or both of the two cases can be performed together.

The BCMC quality report message and the route update message can have PER and SNR (or SIR) information as an example of feedback information. In this case, the PER can be obtained by calculating the Errorpkt/Totalpkt.

After the BCMC quality report message or the route update message has been transmitted, each of the counters Totalpkt and ErrorPkt is reset to zero.

If both values of FeedbackTHEnable and FeedbackPRDEnable received via the broadcast overhead message are zero, the feedback information transmission is not performed.

A base station is able to transmit control information for a BCMC service quality Information feedback via a broadcast overhead message. For instance, the base station is able to transmit the control information using QualityReportMode and QualityReportCount fields included in the overhead message.

Table 1 shows an example of information transmitted via QualityReportMode field.

TABLE 1

| Value | Quality Report Mode |
|---|---|
| 00 | Quality report is disabled |
| 01 | Quality report is enabled for all mobile stations receiving broadcast content |
| 10 | Quality report is enabled for only mobile station that is to receive broadcast content and is in bad condition |
| 11 | Reserved |

QualityReportMode field has information indicating which mobile station will feed back BCMC service quality information to a base station.

Referring to Table 1, if a base station conducts a transmission by setting a QualityReportMode field value to '00', a mobile station having received this does not feed back the BCMC service quality information to the base station.

if a base station conducts a transmission by setting a QualityReportMode field value to '01', all mobile stations receiving a BCMC service feed back the BCMC service quality information to the base station.

If a base station conducts a transmission by setting a QualityReportMode field value to '10', mobile stations having poor BCMC service reception qualities feed back the BCMC service quality information to the base station only.

For instance, mobile stations having PER over 1% feed back BCMC service quality information to a base station. In this case, the mobile station is able to periodically feed back the service quality information to the base station.

Table 2 shows an example of information transmitted via QualityReportCount field. The QualityReportCount field has information for a feedback period.

TABLE 2

| QualityReportCount | QualityReportPeriod (slots) |
|---|---|
| '000' | $2^{15}$ |
| '001' | $2^{16}$ |
| '010' | $2^{17}$ |
| '011' | $2^{18}$ |
| '100' | $2^{19}$ |
| '101' | $2^{20}$ |
| '110' to '111' | Reserved |

Referring to Table 2, a feedback period is decided according to a QualityReportCount value.

For instance, if a base station sets a QualityReportCount field value to '101', BCMC service quality information is fed back to the base station by a period of $2^{20}$ slots. In particular, since the feedback period is decided into QualityReportPeriodX1.66 ms, the BCMC service quality information is fed back by a period of 29 minutes in case that the QualityReportCount field value is '101'.

Figure 6:
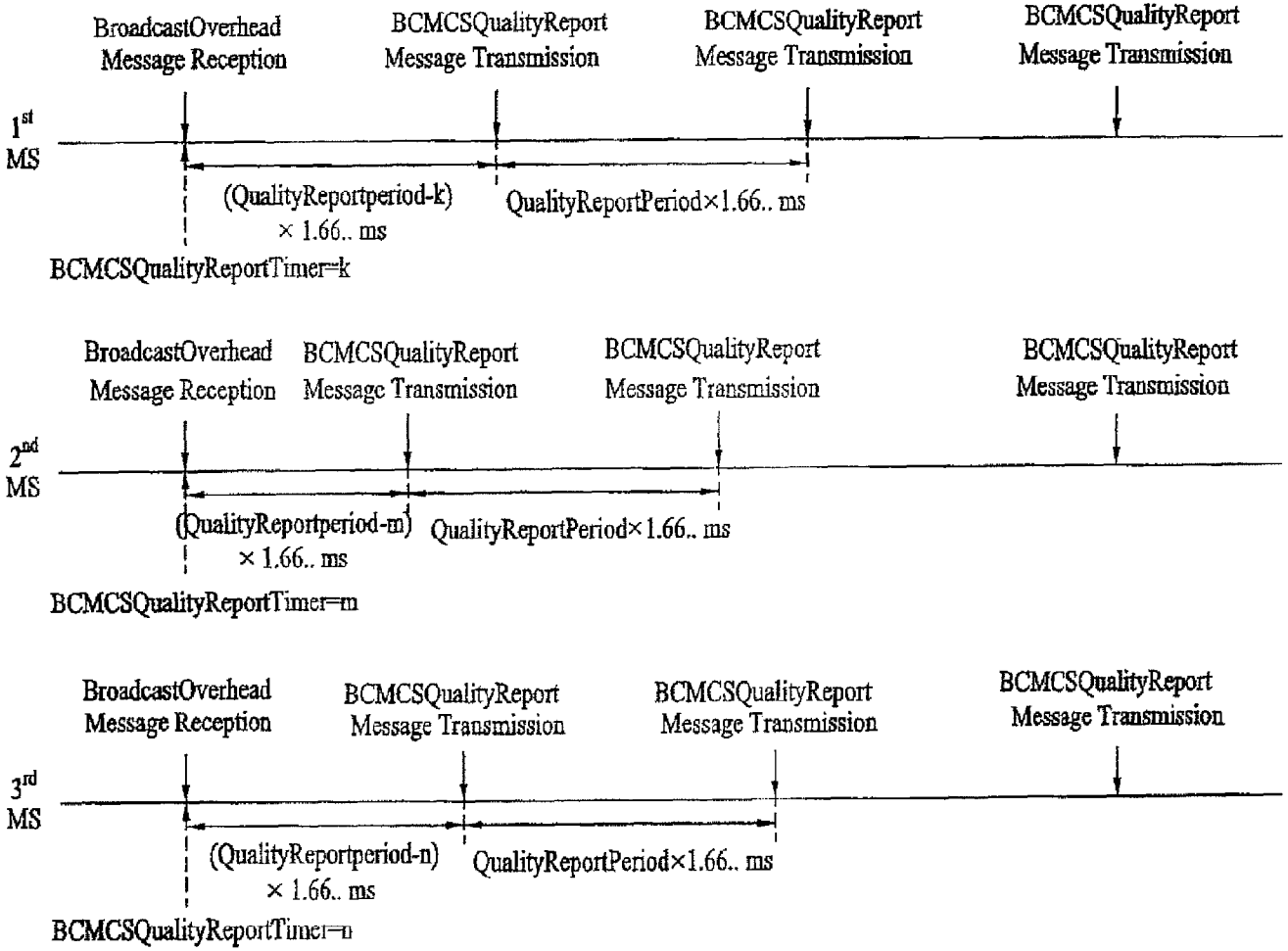
FIG. 6 is a diagram of a feedback timing point of BCMC service quality information according to one embodiment of the present invention.

FIG. 6 is a diagram of a feedback timing point of BCMC service quality information according to one embodiment of the present invention.

Referring to FIG. 6, a first mobile station, a second mobile station and a third mobile station receive a broadcast overhead message at a same timing point.

Meanwhile, a mobile station has a timer named BCMCSQualityReportTimer that operates by a predetermined time unit. In the present embodiment, the timer operates by 1.66.. ms unit for example.

An initial value of the BCMCSQualityReportTimer is set to a pseudorandom value between zero and QualityReport- Period*1.66.. ms. Namely, the Initial value is set to a random value smaller than a feedback period.

So, each of the mobile stations feeds back BCMC service quality Information to a base station at a random timing point within the feedback period from a timing point of receiving the broadcast overhead message. In particular, the corresponding mobile station periodically feeds back the BCMC service quality information with reference to an initial feedback timing point.

Hence, the feedback information transmitting timing points of the mobile stations are not mutually matched, whereby a reverse link load according to the feedbacks of a plurality of the mobile stations can be prevented from increasing.

A mobile station has a counter to calculate a PER. For instance, a pair of counters named TotalPackets and ErrorPackets are explained as follows.

First of all, the TotalPackets is the counter indicating a total number of received packets. The TotalPackets is incremented each time a packet is received.

The ErrorPackets is the counter indicating a total number of packets failing in being decoded. The ErrorPackets is incremented by 1 each time a decoding of the received packet fails.

Hence, the PER can be calculated through a ratio between the ErrorPackets and the TotalPackets. And, each of the counters, ErrorPackets and TotalPackets, are Initially set to zero.

A mobile station calculates a timer expiry value QualityReportTimerMax according to Formula 1 and then stores the calculated value.

$$\text{QualityReportTimerMax}=\text{QualityReportPeriod}\times 1.66..\text{ms} \quad \text{[Formula 1]}$$

If a BCMCSQualityReportTimer value becomes Identical to the timer expiry value QualityReportTimerMax, a mobile station feeds back BCMC service quality information to a base station via BCMCSQualityReport message. As the feedback information transmitted through the BCMCSQualityReport, at least one of PER and SNR can be used.

Table 3 shows an example of BCMCSQualityReport message.

TABLE 3

| Field | Length (bits) |
|---|---|
| MessageID | 8 |
| ChannelQuality | 5 |
| BCMCSFlowFormat | 1 |
| BCMCSFlowIDLength | 2 |
| zero or one occurrence of the following record: | |
| BCMCSFlowCount | 6 |
| BCMCSFlowCount occurrence of the following three fields: | |
| BCMCSFlowID | (BCMCSFlowIDLength + 1) * 8 |
| TotalPackets | 20 |
| ErrorPackets | 10 |
| zero or one occurrence of the following record: | |
| ProgramCount | 6 |
| ProgramCount occurrences of the remaining fields (expect Reserved field): | |
| ProgramIDLSBLength | 5 |
| ProgramIDLSBs | ProgramIDLSBLength |
| FlowDiscriminatorCount | 6 |
| FlowDiscriminatorLength | 0 or 3 |

TABLE 3-continued

| Field | Length (bits) |
|---|---|
| TotalPackets | 20 |
| ErrorPackets | 10 |
| FlowDiscriminateorCount occurrence of the following three fields: | |
| FlowDiscriminator | FlowDiscriminatorLength |
| TotalPackets | 20 |
| ErrorPackets | 10 |
| Reserved | 0-7 (as needed) |

In Table 3, MessageID field is an identifier indicating a type of the present message and can be set to '0×05' for example. ChannelQuality field is a field indicating channel status information and can be represented as a signal to noise ratio (SNR) using pilot signals of a base station. If a BCMC Flow Identifier included in the message shown in Table 3 is specified to a Program IdentifierFlowDiscriminator format, BCMCSFlowFormat field is set to '1'. Otherwise, It is set to '0'.

Meanwhile, BCMCSFlowIDLength field is set to a value of BCMCFlowLwngth received via a broadcast overhead message. BCMClowCount field is omitted if BCMCSFlowFormat field has a value of '1'. Otherwise, it is set to the number of BCMCS flow Identifiers. BCMCSFlowID field indicates a BCMC flow identifier. The BCMCSFlowID field is omitted if BCMCSFlowFormat field has a value of '1'. TotalPackets field means the number of packets received during a reception quality measuring interval. The TotalPackets field is omitted if BCMCSFlowFormat field has a value of 1'.

ErrorPackets field indicates the number of erroneous packets among the packets received for the reception quality measuring interval. The ErrorPackets field is omitted if BCMCSFlowField has a value of '1'. ProgramIDLSBLength field is set to the number of LSB (least significant bits) of ProgramID included in the present message. The ProgramIDLSBLength field is omitted if BCMCSFlowFormat field has a value of '1'. ProgramIDLSBs field is set to ProgramIDLSBLength LSB (least significant bits) of ProgramID.

FlowDiscriminatorCount field means the number of flow discriminators associated with a program to be registered by a mobile station. The FlowDiscriminatorCount field is omitted if BCMCSFlowFormat field has a value of FlowDiscriminatorLength field represents a length of a flow discriminator. The FlowDiscriminatorLength field is omitted if BCMCSFlowFormat field has a value of '0' or if FlowDiscriminatorCount field has a value of '000000'. FlowDiscriminator field indicates a flow discriminator. The Flow Discriminator field is omitted if BCMCSFlowFormat field has a value of '0'.

As shown in Table 3, one general information for a channel status such as SIR is transmitted. Yet, TotalPackets information and ErrorPackets information used in indicating PER corresponding to each BCMCS flow are transmitted as many as the number of BCMCS flows. After the SCMCSQualityReport message has been transmitted, the BCMCSQualityReportTimer timer, TotalPackets counter and ErrorPackets counter are reset to zero.

Meanwhile, a base station transmits a broadcast overhead message including fields associated with the feedback information transmission. For example, QialityReportMode field, MeasureStartTime field and MeasureEndTime field can be used as the fields representing the feedback associated information.

Referring to Table 1, if QualityReportMode field is set to '00', it means that a mobile station needs not to transmit the feedback for a BCMC service. If QualityReportMode field is set to '01', it means that all mobile stations receiving the BCMC service need to periodically transmit the feedback. If QualityReportMode field is set to '10', it means that prescribed mobile stations in poor channel status (e.g., PER is over 1%) among a plurality of mobile stations receiving the BCMC service need to transmit the feedback information.

MeasureStartTime field and MeasureEndTime field have information for an interval for measuring PER. MeasureStartTime is used In deciding a starting point of a PER measurement. And, the starting point of the PER measurement is decided as a timing point that meets Formula 2 for example.

$$(\text{SystemTime}-\text{MeasureStartTime}) \bmod N=0 \qquad \text{[Formula 2]}$$

In Formula 2, a unit of SystemTime or MeasureStartTime is slot (1.66..ms) and 'N' means a period for transmitting BCMCSQualityReport to a base station.

MeasureEndTime is used in deciding an ending point of a PER measurement. And, the ending point of the PER measurement is decided as a timing point that meets Formula 3 for example.

$$(\text{SystemTime}-\text{MeasureEndTime}) \bmod N=0 \qquad \text{[Formula 3]}$$

In Formula 3, a unit of SystemTime or MeasureEndTime is slot (1.66..ms) and 'N' means a period for transmitting BCMCSQualityReport to a base station.

In Formula 2 and Formula 3, a base station is able to decide and transmit a value of N to a mobile station. Alternatively, a value preset between a base station and a mobile station can be used as a value of N. Preferably, the preset value is 218 slots (7.28 minutes). Thus, a mobile station measures PER from one timing point meeting Formula 2 and to the other timing point meeting Formula 3.

So, a base station is able to accurately know the interval for which a mobile station measures PER to recognize a distribution of broadcast packets and unicast packets for the corresponding measurement interval. Hence, the base station is able to compensate inaccuracy of feedback information from the mobile station due to the unicast packets.

Besides, in order to solve a problem caused by the mixed existence of the broadcast and unicast packets, the base station is able to restrict the broadcast packets to be transmitted only for a specific interval for the generation of the feedback information.

A base station may use MeasureStartTime and MeasureDuration fields to transmit PER measurement interval information. In particular, the base station uses MeasureStartTime to indicate a starting point of measuring PER and MeasureDuration to indicate an interval for measuring PER from the starting point. In this case, the starting point of measuring PER is decided using Formula 2 and an ending point of the PER measurement can be decided using Formula 4.

$$\{\text{SystemTime}-(\text{MeasureStartTime}+\text{MeasureDuration})\} \bmod N=0 \qquad \text{[Formula 4]}$$

The PER measurement is executed until a timing point that SystemTime meets Formula 4. In Formula 4, a unit of SystemTime, MeasureStartTime or MeasureDuration is slot (1.66..ms) and 'N' means a period for transmitting BCMCSQualityReport to a base station.

In Formula 4, a base station is able to decide and transmit a value of N to a mobile station. Alternatively, a value preset between a base station and a mobile station can be used as a value of N. Preferably, the preset value is 218 slots (7.28 minutes). Thus, a mobile station measures PER from one timing point meeting Formula 2 and to the other timing point meeting Formula 4.

A base station has a timer named BCMCSQualityReportTimer that operated by a unit of slot (1.66..ms). The timer is set to a pseudorandom value between 0 and {N-(MeasureEndTime-MeasureStartTime)−1) mod N}×1.66..ms. The timer is decreased by slot unit (1.66..ms). And, BCMCSQualityReport message is transmitted at a timing point at which the timer becomes zero. By enabling the timer set value to have a pseudorandom value, it is able to prevent excessive loads from being given to a base station if mobile stations transmit feedback Information simultaneously.

Figure 7:
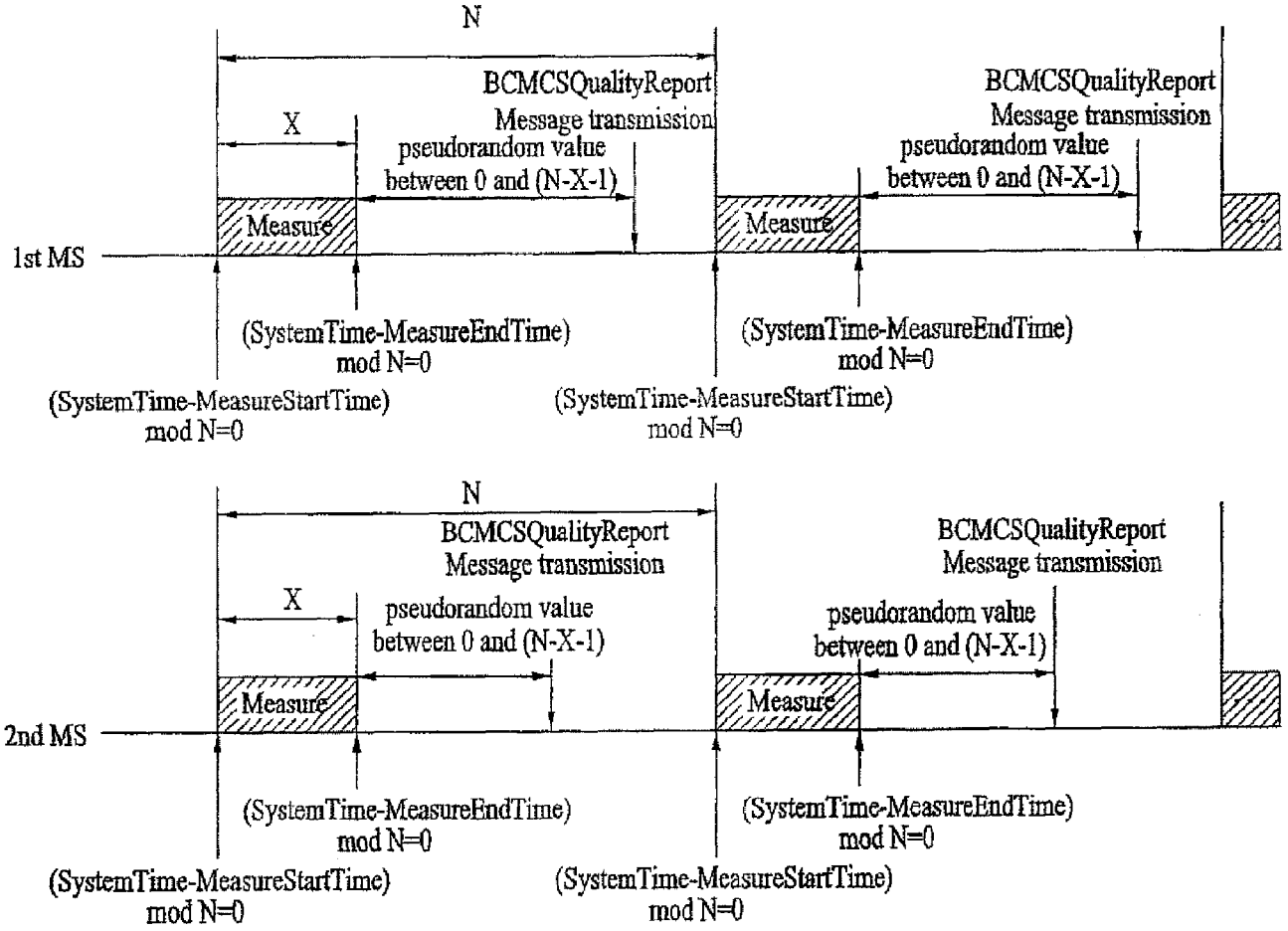
FIG. 7 is a diagram of a feedback timing point of BCMC service quality information according to another embodiment of the present invention.

FIG. 7 is a diagram of a feedback timing point of BCMC service quality information according to another embodiment of the present invention.

Referring to FIG. 7, a first mobile station ($1^{st}$ MS) measures PER according to Formula 2 and Formula 3 and then transmits BCMCSQuaityReport message according to the BCMCSQualityReportTimer timer. A second mobile station ($2^{nd}$ MSS) measures PER according to Formula 2 and Formula 3 and then transmits BCMCSQualityReport message according to the BCMCSQualityReportTimer timer. However, since the first and second mobile stations have pseudorandom values as BCMCSQualityReportTimer set values, respectively, they transmit the BCMCSQualityReport messages at different timing points, respectively.

A mobile station sets a status indicator value and is then able to perform the operation shown in FIG. 7 using the status indicator value. For instance, a first status indicator (RqualityReportEnabled), a second status indicator (RqualityReportTimerEnabled) and a third status Indicator (RqualityMeasureEnabled) can be used. The first status indicator (RqualityReportEnabled) is set to 'NO' only if a value of QualityReportMode field is '00'. Otherwise, the first status Indicator (RqualityReportEnabled) is set to 'YES'.

If the first status indicator (RqualityReportEnabled) is 'YES', the third status indicator (RqualityMeasureEnabled) is set to 'YES' each time. Formula 2 is met. If the first status indicator (RqualityReportEnabled) is 'YES', the third status indicator (RqualityMeasureEnabled) is set to 'NO' each time Formula 3 or Formula 4 is met. Meanwhile, if the first status indicator (RqualityReportEnabled) is 'NO', the third status indicator (RqualityMeasureEnabled) is set to 'NO'.

If a value of the third status indicator (RqualityMeasureEnabled) is changed into 'NO' from 'YES', the second status indicator (RqualityReportTimerEnabled) is set to 'YES'. If BCMCSQuaiityReport message is transmitted, the second status indicator (RqualityReportTimerEnabled) is set to 'NO'.

A mobile station is able to transmit feedback information if the first status indicator (RqualityReportEnabled) is set to 'YES'. A mobile station is able to measure feedback information for an interval during which the third status indicator (RqualityMeasureEnabled) is set to 'YES'. And, a mobile station activates QualityReportTimer if the second status indicator (RqualityReportTimerEnabled) is set to 'YES'.

In case of transmitting the feedback information on an access channel, the mobile station decides that the feedback is successful if receiving transmission success information (TransmissionSuccessful indication). In case of transmitting the feedback information on a reverse traffic channel, the mobile station decides that the feedback is successful by transmitting BCMCSQuaiityReport message.

Meanwhile, in transmitting feedback information, a mobile station is able to transmit its position Information as well as PER and SNR. If a base station obtains the position information of the mobile station as well as PER or SNR, the base station is able to recognize an area having a poor channel situation. Hence, necessary management can be provided to such an area.

Besides, if a predetermined condition is met for a mobile communication terminal, it is able to stop the feedback information transmission. For Instance, if a mobile station, which measures PER and SNR and transmits feedback information, performs a handoff into another cell area, a base station may be confused in understanding whether the received feedback information it the information corresponding to an old base station or a current serving base station. So, in such a case, it is able to make the mobile station stop the feedback information transmission.

As explained in the foregoing description, a base station having received feedback information from a mobile station performs a BCMC service transmission based on the received feedback information.

In particular, according to the received feedback information, in case that a channel status is not good, a transmission is performed by lowering a data rate. If the channel status becomes better, the transmission can be performed by raising the data rate. In the example shown in FIG. 3, in case that a channel status is degraded like the cell D, mobile stations within the cell transmit feedback information. A base station controls reception quality of the BCMC service based on the feedback information. The reception quality of the BCMC service can be controlled by changing a transmission format with which the BCMC service data is transmitted. The transmission format means a combination of at least two transmission parameters (e.g. a number of data bits included in a frame, a modulation scheme, a channel coding rate, or a channel coding scheme) with which the base station transmits the BCMC service data to the mobile stations.

For example, if the number of mobile stations transmitting the feedback information, which indicates that the channel status becomes good, exceeds a first threshold, the data rate and the coding rate can be raised. If the number of mobile stations transmitting the feedback information, which indicates that the channel status becomes poor, exceeds a second threshold, the data rate and the coding rate can be lowered. Moreover, the data rate can be raised only if the feedback information indicating that the channel statuses of the entire mobile stations become good is received. And, the data rate can be lowered only if the feedback Information indicating that the channel statuses of the entire mobile stations become poor is received.

Thus, in case that a base station decides a new data rate using feedback information, the base station transmits the decided data rate information to mobile stations within a cell via a broadcast overhead message and then performs a BCMC service according to the decided data rate.

Meanwhile, in aspect of a service provider, a smooth service can be performed on an area, of which channel situation is decided poor according to feedback information, by redesigning a cell or installing a repeater additionally. And, the feedback information can be used as a database for customer management. So, the customer management can be enhanced in a manner of recognizing a user failing to receive the BCMC service correctly using the feedback information.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention is applicable to a wireless communication system such as a mobile communication system, a broadband wireless access system, or a mobile internet system, etc.

The invention claimed is:

1. A method of controlling a point-to-multipoint service transmission in a mobile communication system, the method comprising:

receiving point-to-multipoint service data from a base station;

receiving control information from the base station, the control information associated with reception quality information of the received point-to-multipoint service data;

measuring a reception quality of the received point-to-multipoint service data; and transmitting the reception quality information for the point-to-multipoint service data to the base station according to the control information, wherein the control information includes an indicator of at least one mobile station that transmits the reception quality information, wherein the control information further includes information for a reception quality information transmission mode, wherein the reception quality information transmission mode corresponds to at least a periodic mode or a threshold mode, wherein the control information further includes a transmission period of the reception quality information if the reception quality information transmission mode corresponds to the periodic mode;

wherein the control information further includes threshold information for the reception quality information transmission if the reception quality information transmission mode corresponds to the threshold mode; and wherein the control information further includes the transmission period of the reception quality information and the threshold information for the reception quality information transmission if the reception quality information transmission mode corresponds to the periodic mode and the threshold mode.

2. The method of claim 1, wherein the control information includes information for a transmission condition of the reception quality information, the transmission condition being to stop transmitting the reception quality information during performance of a handoff.

3. The method of claim 1, wherein:

the reception quality information is transmitted when a packet error rate or a signal to noise ratio (SNR) exceeds a threshold and the reception quality information transmission mode corresponds to the threshold mode; and the reception quality information is transmitted to the base station according to the transmission period if the reception quality information transmission mode corresponds to the periodic mode.

4. The method of claim 1, wherein measuring the reception quality comprises checking the reception quality during a reception quality measuring interval according to information in the control information for a reception quality measurement starting point and a reception quality measurement ending point.

5. The method of claim 4, wherein:

the reception quality measurement starting point is a timing point that meets (SystemTime−MeasureStartTime) mod N=0;

the information for the reception quality measurement starting point is MeasureStartTime; and N is a reception quality information transmission period.

6. The method of claim 5, wherein:

the reception quality measurement ending point is a timing point that meets (SystemTime−MeasureEndTime) mod N=0; and the information for the reception quality measurement ending point is MeasureEndTime.

7. The method of claim 5, wherein:

the reception quality measurement ending point is a timing point that meets {SystemTime−(MeasureStartTime+MeasureDuration)} mod N=0; and the information for the reception quality measuring interval is MeasureDuration.

8. The method of claim 7, wherein the reception quality information is transmitted at a pseudorandom timing point after the reception quality measurement ending point with the transmission period.

9. The method of claim 4, wherein a unicast packet is not received during the reception quality measuring interval.

10. A method of providing a point-to-multipoint service in a mobile communication system, the method comprising:

transmitting point-to-multipoint service data to a plurality of mobile stations;

transmitting control information to the plurality of mobile stations, the control information associated with reception quality information of the point-to-multipoint service data to;

receiving the reception quality information for the point-to-multipoint service data, the reception quality information transmitted from at least one of the plurality of mobile stations according to the control information; and controlling a quality of the point-to-multipoint service according to the reception quality information, wherein the control information includes an indicator of at least one mobile station that shall transmit the reception quality information, wherein the control information further includes information for a reception quality information transmission mode, wherein the reception quality information transmission mode corresponds to at least a periodic mode or a threshold mode, wherein the control information further includes a transmission period of the reception quality information if the reception quality information transmission mode corresponds to the periodic mode;

wherein the control information further includes threshold information for the reception quality information transmission if the reception quality information transmission mode corresponds to the threshold mode; and wherein the control information further includes the transmission period of the reception quality information and the threshold information for the reception quality information transmission if the reception quality information transmission mode corresponds to the periodic mode and the threshold mode.

11. The method of claim 10, wherein the control information includes information for a transmission condition of the reception quality information.

12. The method of claim 10, wherein controlling the quality of the point-to-multipoint service comprises adjusting a data rate of the point-to-multipoint service data.

* * * * *